United States Patent
Mehrer et al.

(10) Patent No.: US 7,095,601 B2
(45) Date of Patent: Aug. 22, 2006

(54) HIGH ENERGY PRIMARY SPARK IGNITION SYSTEM FOR A GAS TURBINE ENGINE

(75) Inventors: Michael E. Mehrer, San Diego, CA (US); Daih-Yeou Chen, San Diego, CA (US); Joseph James, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 177 days.

(21) Appl. No.: 10/922,699

(22) Filed: Aug. 20, 2004

(65) Prior Publication Data

US 2006/0037304 A1  Feb. 23, 2006

(51) Int. Cl.
*G08B 21/00* (2006.01)

(52) U.S. Cl. .................. 361/253; 361/247; 361/256

(58) Field of Classification Search ............. 361/247, 361/253, 256

See application file for complete search history.

(56) References Cited

U.S. PATENT DOCUMENTS

| | | | | |
|---|---|---|---|---|
| 5,399,942 A | | 3/1995 | Frus ................ | 315/209 R |
| 5,561,350 A | * | 10/1996 | Frus et al. .......... | 315/209 R |
| 5,675,257 A | * | 10/1997 | Frus ................ | 324/380 |
| 5,852,381 A | | 12/1998 | Wilmot et al. ...... | 327/440 |
| 5,936,830 A | * | 8/1999 | Rousseau et al. .... | 361/253 |
| 6,104,143 A | | 8/2000 | Bonavia ............ | 315/209 CD |
| 6,232,703 B1 | | 5/2001 | Huffman ........... | 313/140 |
| 6,603,216 B1 | | 8/2003 | Costello ........... | 290/41 |

* cited by examiner

*Primary Examiner*—Stephen W. Jackson
(74) *Attorney, Agent, or Firm*—Carlson, Gaskey & Olds

(57) ABSTRACT

An exciter circuit for a gas turbine engine delivers a first single high-energy spark followed by subsequent sparks of relatively lower energy to ensures start reliability by specifically clearing ice build-up at the ignition plugs.

5 Claims, 2 Drawing Sheets

HIGH ENERGY PRIMARY SPARK IGNITION SYSTEM FOR A GAS TURBINE ENGINE

BACKGROUND OF THE INVENTION

The present invention relates to an ignition system for a gas turbine engine, and more particularly to an ignition system which delivers a first single high-energy spark followed by subsequent sparks of lower energy.

Gas turbine engine ignition systems typically include an ignition exciter that generates the discharge energy used to fire the ignition plugs or igniters. These circuits are commonly used within the aviation industry, but are not limited to aircraft turbine engines. For example, gas turbine generators and other small turbine engines will typically utilize exciter circuits to provide spark energy to one or more igniter plugs.

A start sequence for a gas turbine engine that coordinates engine speed, ignition and fuel delivery to achieve a reliable start. Conventionally, a dedicated starter motor or a starter-generator, is drivably coupled to the gas turbine engine and is operated to produce rotation thereof. As the starter accelerates the engine, a fuel delivery pump driven by a gearbox attached to a rotor of the gas turbine engine provides fuel flow thereto. The igniters are then fired to effect ignition in a combustor of the engine. Upon successful ignition, and once the engine has reached a self-sustaining speed, the starter is disengaged.

In operation of gas turbine engines, specifically Auxiliary Power Units (APUs), failure to start may result due to ice build-up on the ignition plug tip. Such occurrences may be of particular concern during high altitude operation.

Accordingly, it is desirable to provide an ignition system for a gas turbine engine that ensures start reliability by specifically clearing ice build-up at the ignition plugs in an inexpensive, uncomplicated and lightweight arrangement.

SUMMARY OF THE INVENTION

The exciter circuit according to the present invention delivers a first single high-energy spark followed by subsequent sparks of relatively lower energy.

The present invention therefore provides an ignition system for a gas turbine engine that ensures start reliability by specifically clearing ice build-up at the ignition plugs in an inexpensive, uncomplicated and lightweight arrangement.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
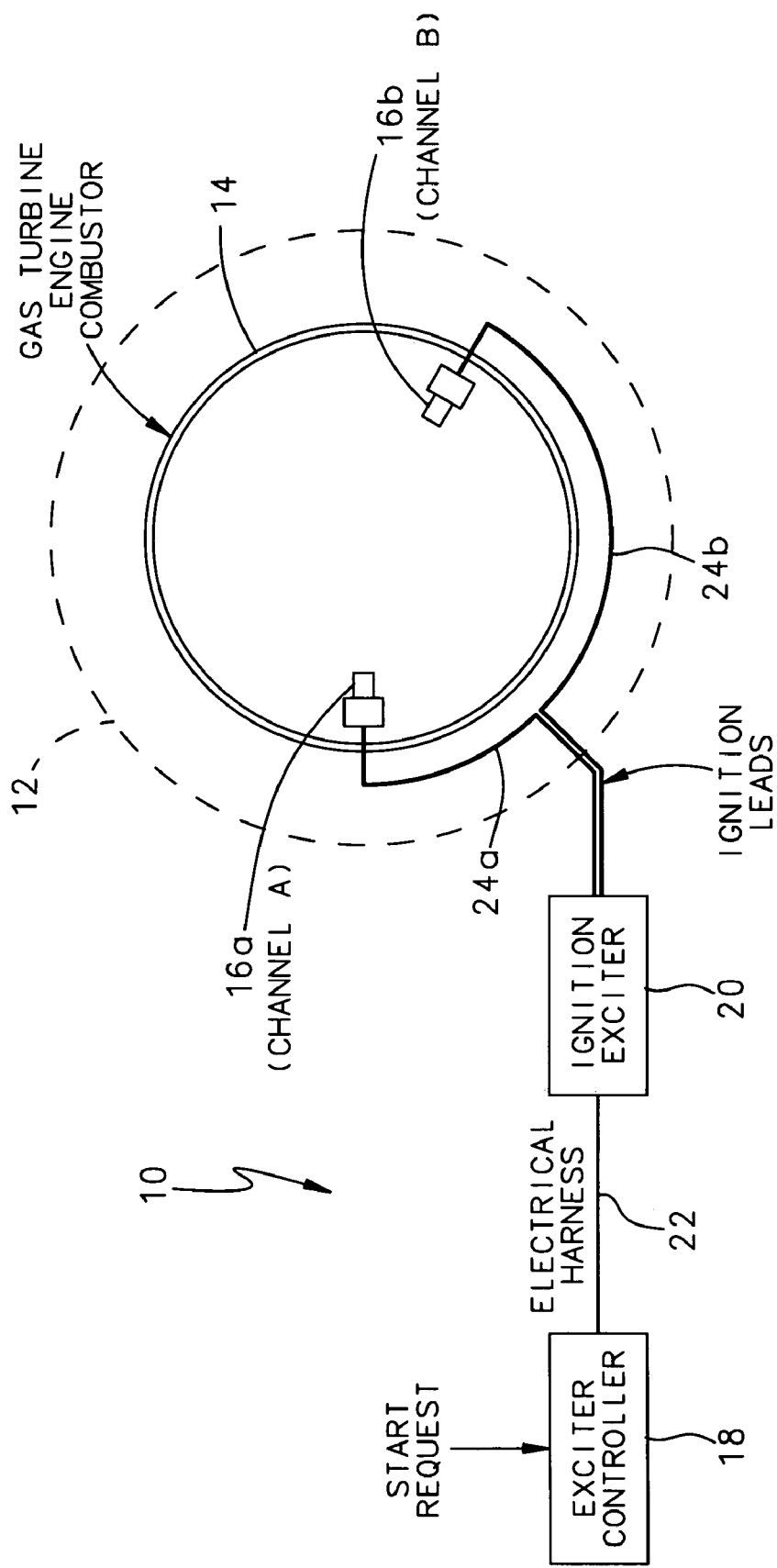
FIG. 1 is a general perspective view an exemplary gas turbine engine start system for use with the present invention.

FIG. 1 illustrates a general schematic view of an ignition system 10 for a gas turbine engine 12 (illustrated schematically) such as an auxiliary power unit (APU). It should be understood that the ignition system may be used in other applications, such as in a stationary generating station or ground based unit for a vehicle or the like.

The ignition system 10 operates to ignite a fuel-air mixture in an engine combustor 14 through a first ignition plug 16a and a second ignition plug 16b. An exciter controller 18 communicates with an ignition exciter 20 through a wiring harness 22 or the like. The ignition exciter 20 drives the ignition plug 16a and the second ignition plug 16b through a first ignition lead 24a and a second ignition lead 24b, respectively in response to the exciter controller 18.

The first ignition lead 24a and the first ignition plug 16a is herein referred to as Channel A while the second ignition lead 24b and the second ignition plug 16b is herein referred to as Channel B. It should be understood that any number of channels will benefit from the present invention.

Figure 2:
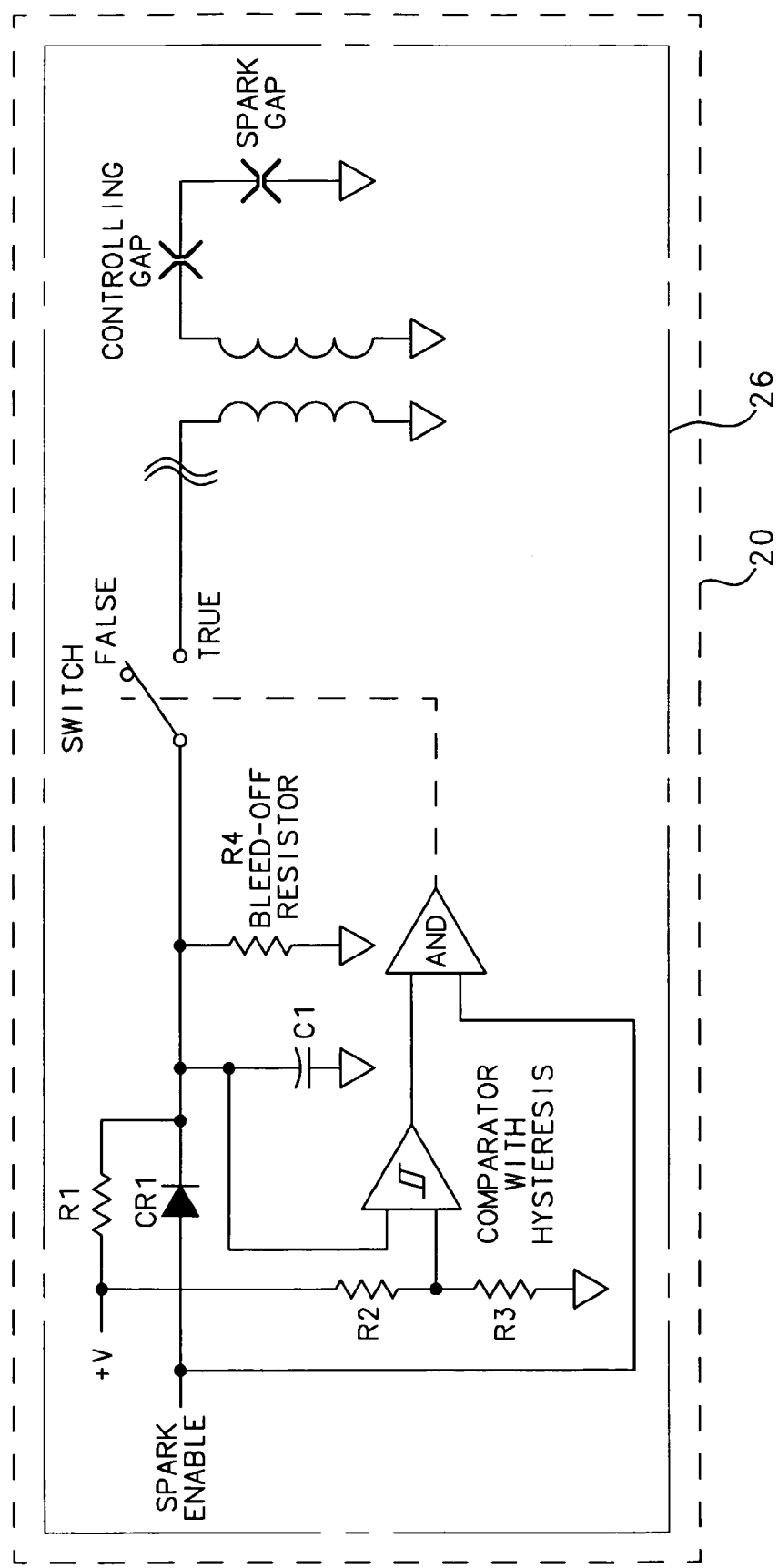
FIG. 2 is an electric circuit diagram of an exciter circuit according to the present invention.

In operation, a start sequence is initiated with a START REQUEST command. The START REQUEST command initiates operation of the exciter controller 18 and begins acceleration of the gas turbine engine 12 toward a light off window to await ignition in response to a SPARK ENABLE command sent from the exciter controller 18. When the exciter controller 18 is energized by the START REQUEST command, current begins to flow to a capacitor C1 (FIG. 2). Once the exciter controller 18 recognizes that the gas turbine engine 12 has reached a light-off window, the exciter controller 18 initiates SPARK ENABLE (FIG. 2).

Referring to FIG. 2, an electric circuit diagram illustrates an exciter circuit 26 of the ignition exciter 20 which selectively fires Channel A and/or Channel B. Generally, the exciter circuit 26 delivers a first single high-energy spark followed by subsequent sparks of low energy.

The First Single High Energy Spark

At START REQUEST, +V is set high such that current flows to charge capacitor C1 from a power source. The capacitor C1 is allowed sufficient time to fill prior to a SPARK ENABLE. Pre-charging of C1 allows a spark to immediately follow the SPARK ENABLE command which reduces the time between when the ignition exciter 20 is commanded to spark by the exciter controller 18 and the time that the first spark occurs which to improve correlation with the light-off window and increase dependability of light-off.

The resistor divider of resistor R2 and resistor R3 establishes a trigger level at the COMPARATOR. During the charging of the capacitor C1, the COMPARATOR is enabled when the voltage of CAPACITOR C1 exceeds the trigger level of the COMPARATOR.

The SPARK ENABLE and the +V are both logical discretes determined by the exciter controller 18. When the exciter controller 18 receives the START REQUEST, the exciter controller 18 sets the SPARK ENABLE high. The AND gate is satisfied since both capacitor C1 is greater than the COMPARATOR trigger and SPARK ENABLE is TRUE. The AND gate output sets the SWITCH to the TRUE position and the high energy stored in capacitor C1 is released across the CONTROLLING GAP which fires the ignition spark across the SPARK GAP. The SWITCH is then set TRUE for the first single high-energy spark by the AND gate when SPARK ENABLE becomes TRUE. Generation of the first single high-energy spark clears potential ice build-up which may otherwise prevent proper arcing of the ignition plugs 16a, 16b (FIG. 1).

The Subsequent Low Energy Sparks

The sparks following the first spark are of a lower energy than the first spark. The amount of energy stored in capacitor C1 prior to the SWITCH becoming TRUE for the sparks following the first single high-energy spark is limited since the COMPARATOR now controls the SWITCH and prevents the capacitor C1 from charging to the first single spark high-energy spark level. The COMPARATOR level controls the amount of energy stored in capacitor C1.

The nominal, relatively low-energy sparks, are then sufficient to successfully ignite the gas turbine engine combustor fuel/air mixture after clearing ice build-up with the first single high-energy spark.

Following the start sequence and once the gas turbine engine 12 has achieved a self-sustaining speed, the exciter controller 18 sets both the SPARK ENABLE and +V logical discretes to a FALSE State. After +V and SPARK ENABLE are set FALSE, any charge remaining in capacitor C1 is communicated to the bleed-off resistor R4 which permits capacitor C1 to discharge.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An ignition system for a gas turbine engine comprising:
   an exciter controller;
   an ignition plug; and
   an ignition exciter to drive said ignition plug, said ignition exciter in communication with said exciter controller, said ignition exciter including an exciter circuit with a capacitor and a resistor divider connected to a comparator to generate a multiple of low-energy sparks subsequent to a first single high energy spark.

2. The ignition system as recited in claim 1, wherein said comparator is connected to an AND gate.

3. The ignition system as recited in claim 2, wherein said AND gate is connected to a switch, said switch in communication with a SPARK ENABLE and a +V logical discrete.

4. The ignition system as recited in claim 3, further comprising a bleed off resistor connected between said capacitor and said switch.

5. The ignition system as recited in claim 1, wherein said resistor divider establishes a voltage level of said low energy spark.

* * * * *